(12) United States Patent
Kernes

(10) Patent No.: US 7,117,841 B2
(45) Date of Patent: Oct. 10, 2006

(54) K.ENGINE

(76) Inventor: Georgi Joseph Kernes, 30 Liza Harmon Dr. #321, Westbrook, ME (US) 04092

(*) Notice: Subject to any disclaimer, the term of this patent is extended or adjusted under 35 U.S.C. 154(b) by 0 days.

(21) Appl. No.: 10/939,562

(22) Filed: Sep. 14, 2004

(65) Prior Publication Data

US 2006/0054129 A1 Mar. 16, 2006

(51) Int. Cl.
F02B 53/00 (2006.01)
F02B 53/04 (2006.01)
F01C 1/00 (2006.01)
F02B 19/00 (2006.01)
F04C 2/00 (2006.01)
F04C 18/00 (2006.01)

(52) U.S. Cl. .................... 123/241; 123/249; 123/231; 123/237; 418/246; 418/249

(58) Field of Classification Search ................ 123/241, 123/244, 246, 231, 237, 200; 418/246, 249, 418/264, 260, 136

See application file for complete search history.

(56) References Cited

U.S. PATENT DOCUMENTS

| | | | | | |
|---|---|---|---|---|---|
| 1,458,361 | A | * | 6/1923 | Ruttledge | 418/136 |
| 2,121,660 | A | * | 6/1938 | Hammers | 123/241 |
| 2,343,948 | A | * | 3/1944 | Bellazini | 123/241 |
| 2,387,707 | A | * | 10/1945 | Woolley | 123/244 |
| 2,500,458 | A | * | 3/1950 | Hinckley | 123/225 |
| 3,244,157 | A | * | 4/1966 | Tanferna | 418/246 |
| 3,660,978 | A | * | 5/1972 | Hinckley | 123/237 |
| 3,855,977 | A | * | 12/1974 | Statkus | 123/241 |
| 3,894,519 | A | * | 7/1975 | Moran | 123/244 |
| 3,924,976 | A | * | 12/1975 | Hinckley | 418/249 |
| 4,178,900 | A | * | 12/1979 | Larson | 123/244 |
| 4,381,737 | A | | 5/1983 | Turner | |
| 4,909,208 | A | | 3/1990 | Krisztics | |
| 5,010,860 | A | | 4/1991 | Broussard | |
| 6,247,443 | B1 | | 6/2001 | Pelleja | |
| 6,276,329 | B1 | | 8/2001 | Archer | |
| 6,298,821 | B1 | | 10/2001 | Bolonkin | |
| 6,321,699 | B1 | | 11/2001 | Britton | |
| 6,606,973 | B1 | | 8/2003 | Moe | |
| 6,688,276 | B1 | | 2/2004 | Baptista et al. | |
| 6,796,285 | B1 | * | 9/2004 | Karnes | 123/241 |

FOREIGN PATENT DOCUMENTS

| | | | |
|---|---|---|---|
| DE | 3918303 A1 | * | 12/1990 |
| EP | 103985 A2 | * | 3/1984 |
| JP | 61241420 A | * | 10/1986 |

* cited by examiner

Primary Examiner—Thai-Ba Trieu

(57) ABSTRACT

K. Engine (KE) is rotary internal combustion engine, combination Reciprocating Engine (RE) and Gas Turbine (GT) comprising coaxially separate piston rotary compressor and turbine having housings with annular channels, outside combustion chambers (CH) unified with rotary valve mechanisms, staggered partitions dividing the annular channels for separate cylinders or freely passing the pistons; control means governing the partitions allow operational adjustment displacement volume KE without a brake effect; separate CHs secure ideal combustion in constant volume, unrestricted analog of advance of an ignition and forced ventilation; combined Otto- Brighton cycle and simple design provide high efficiency and reliability, great fuel economy, small sound and pollution; optimal work diapason KE is wider of both GT and RE; weight and size KE led to RE of the same displacement volume is 10 times less but more power and torque.

11 Claims, 10 Drawing Sheets

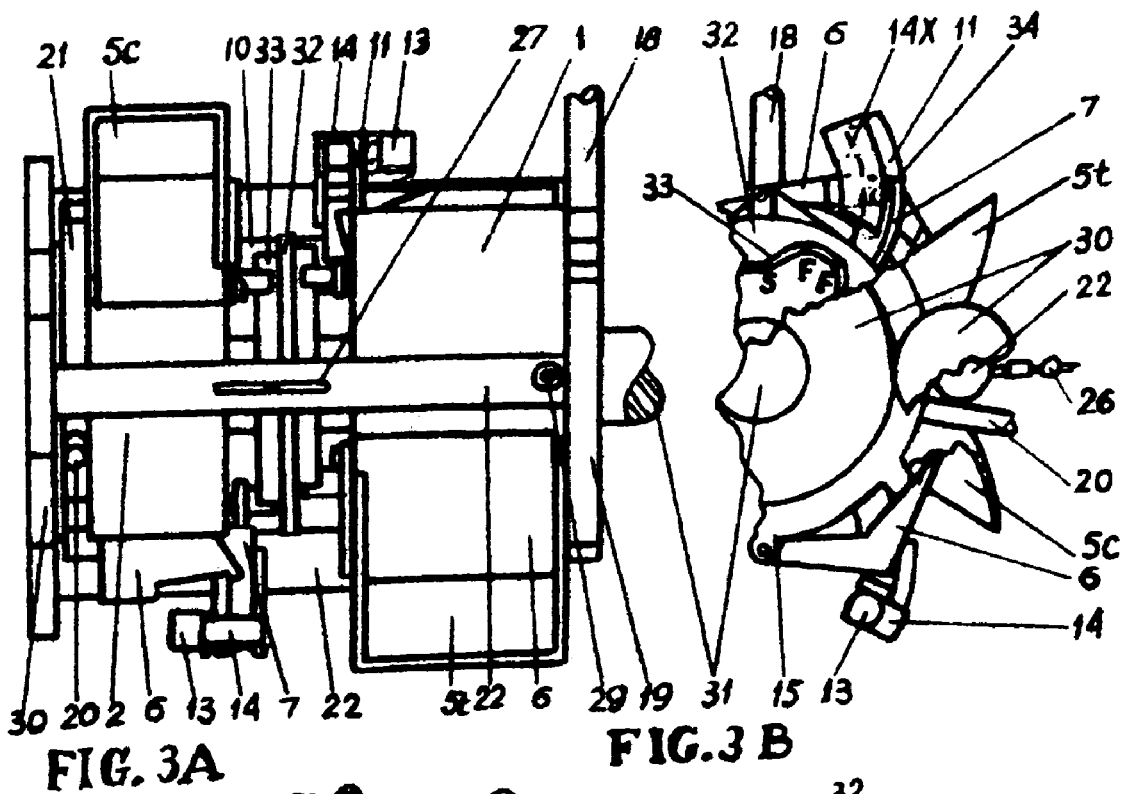
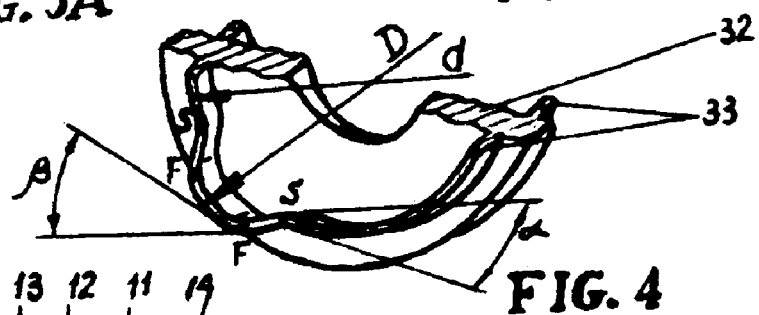
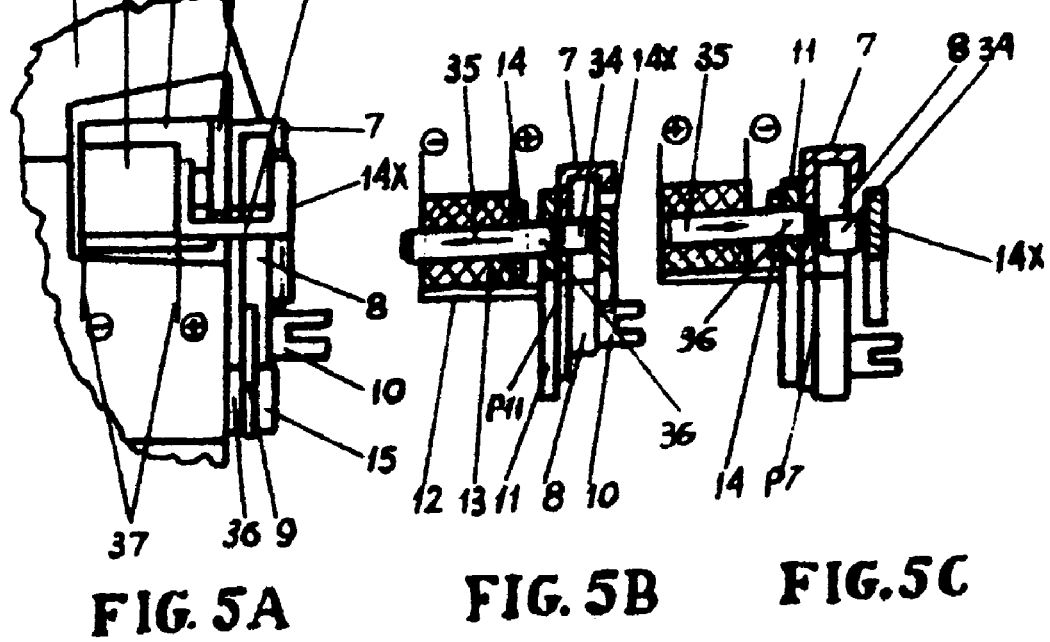

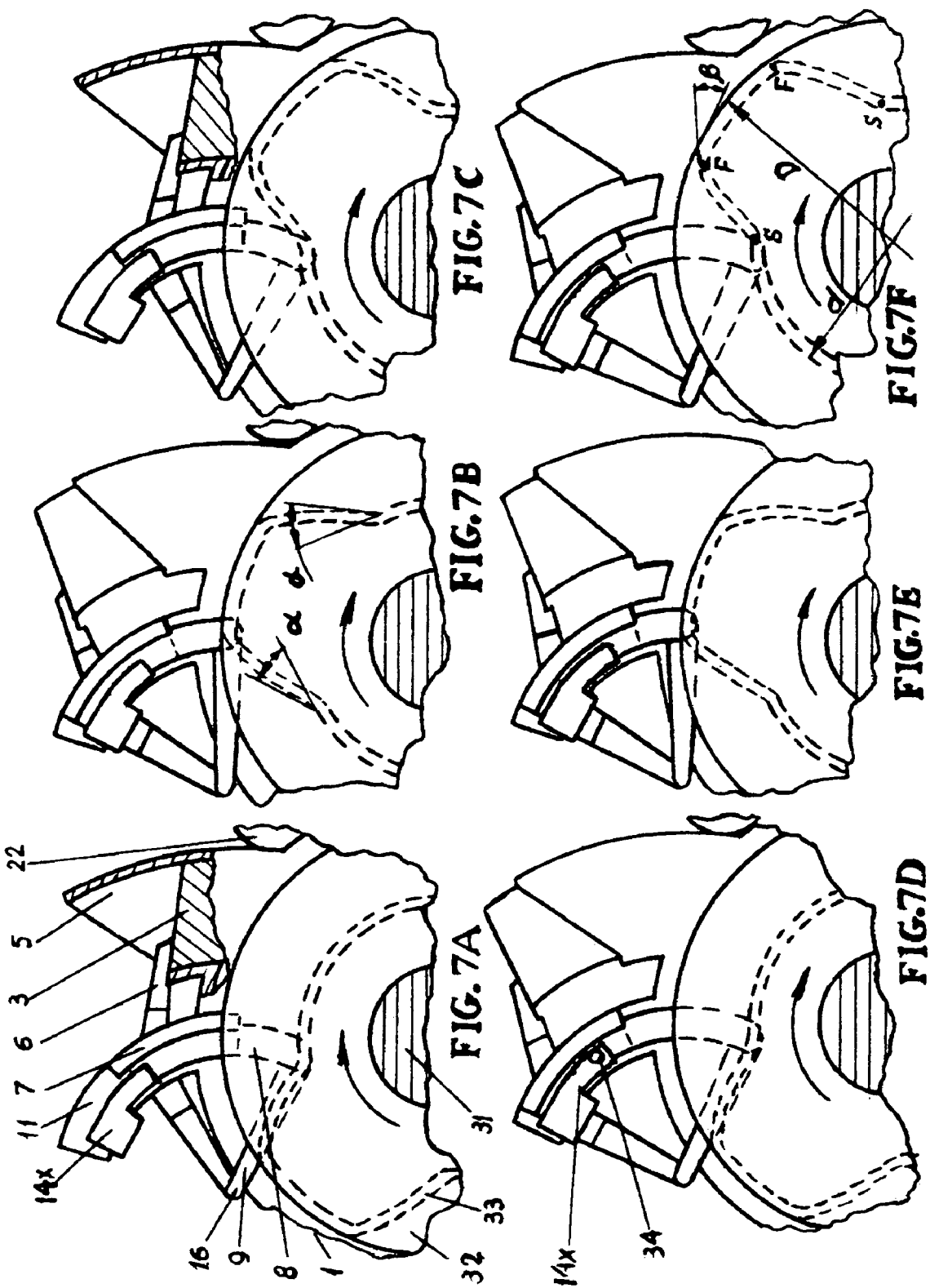

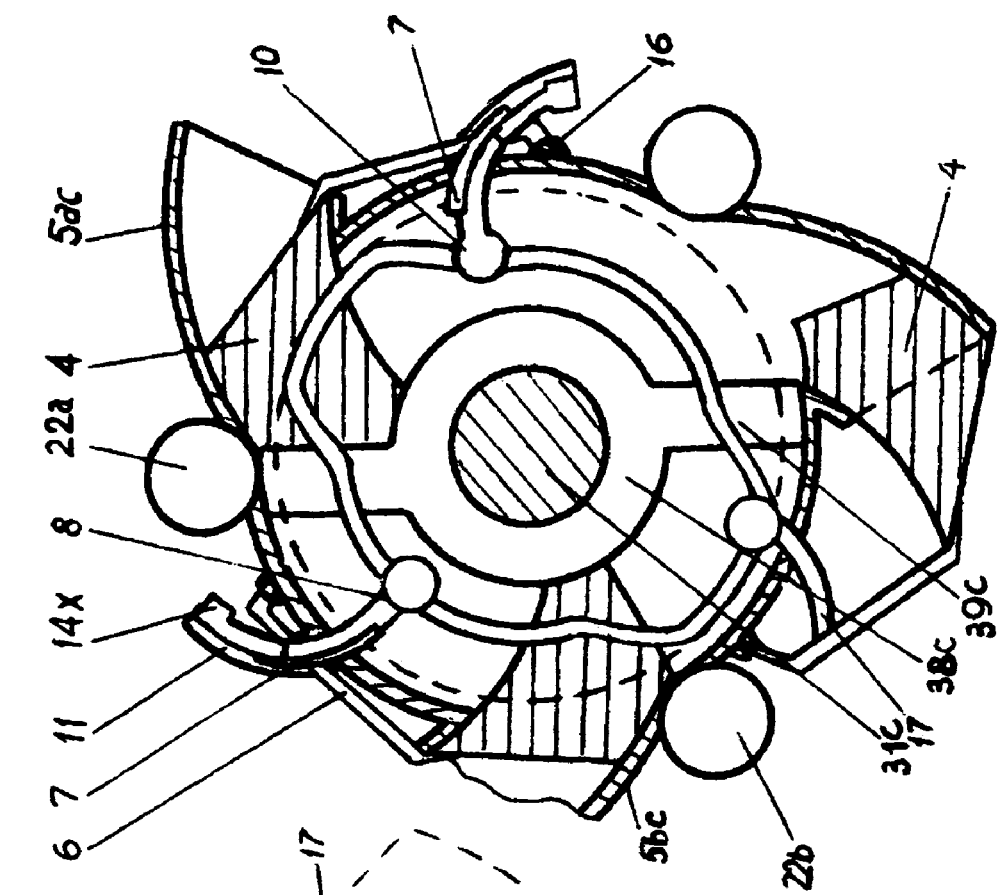
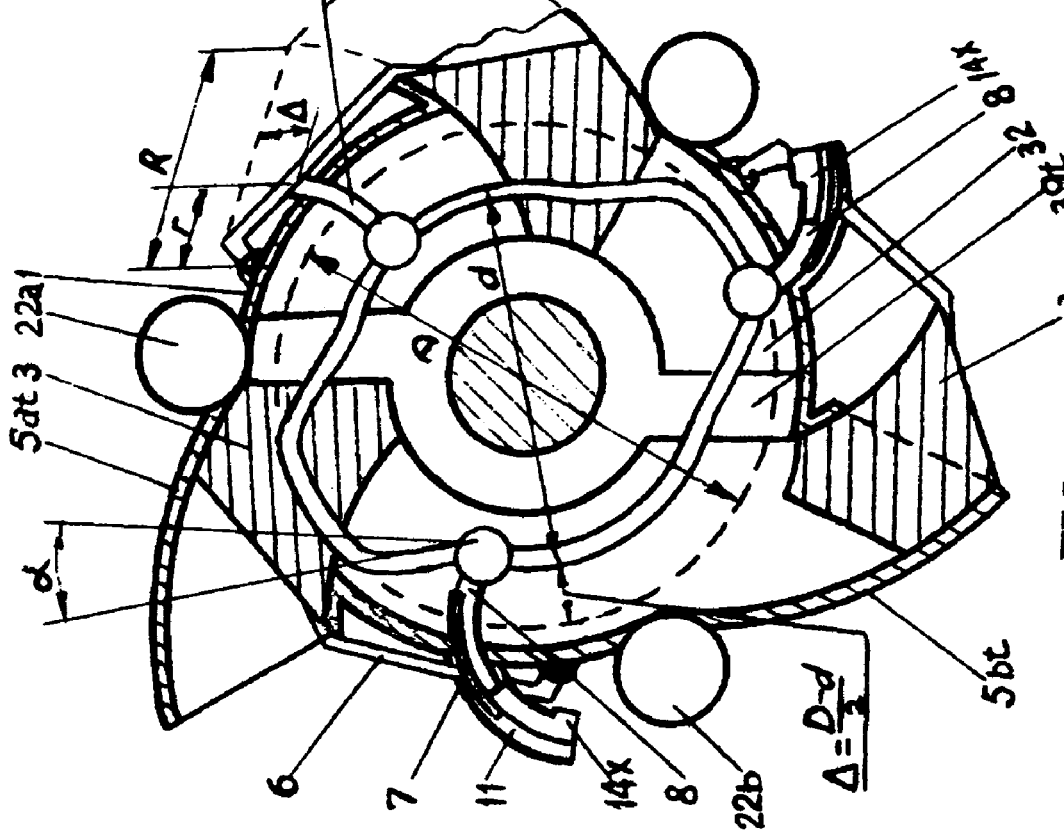

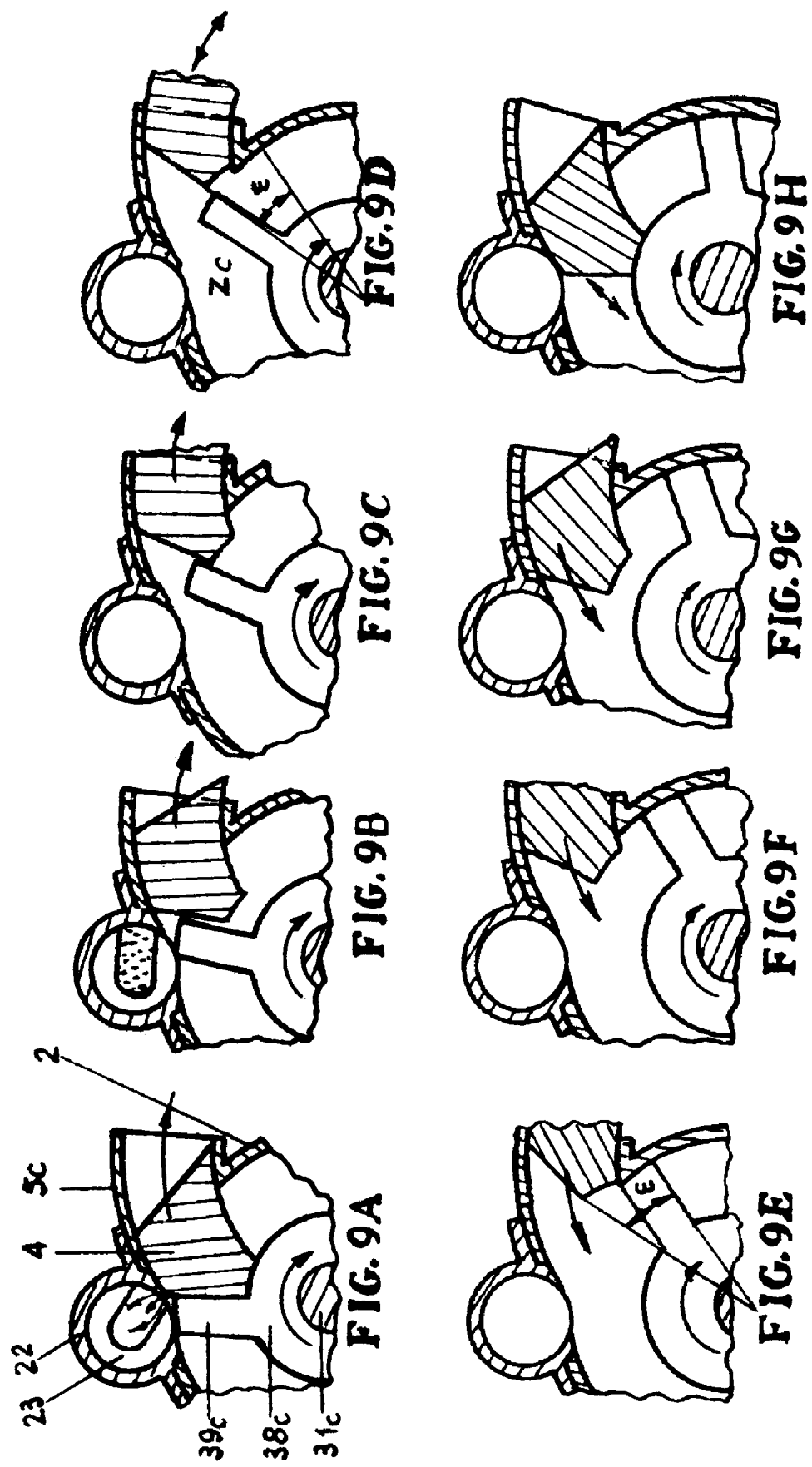

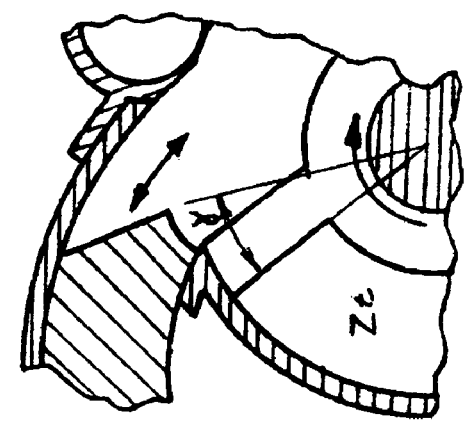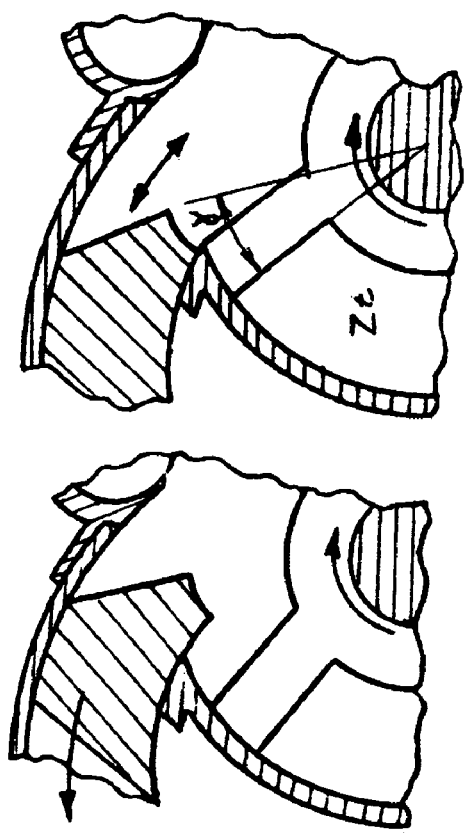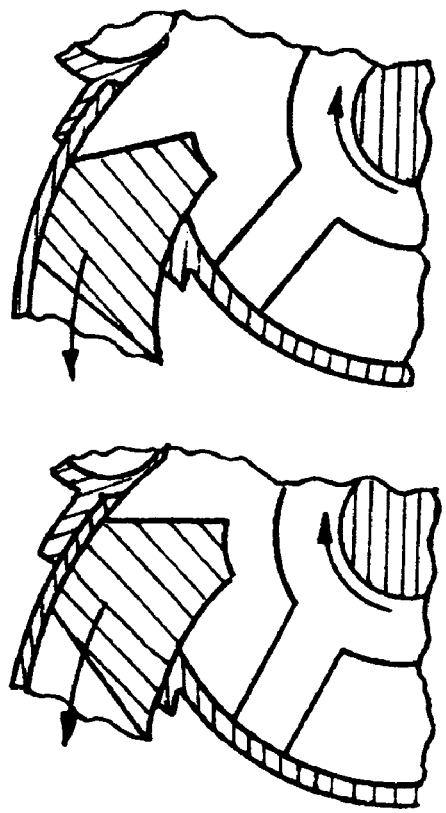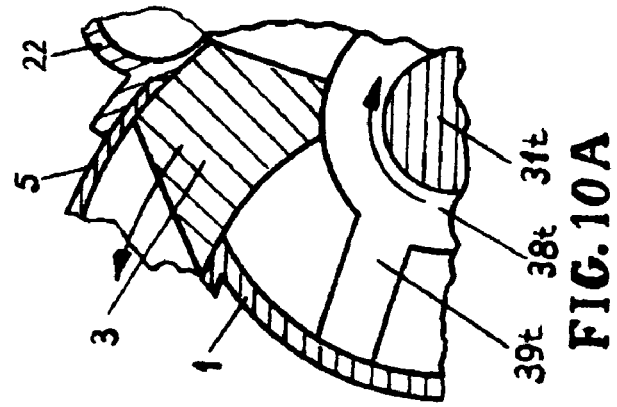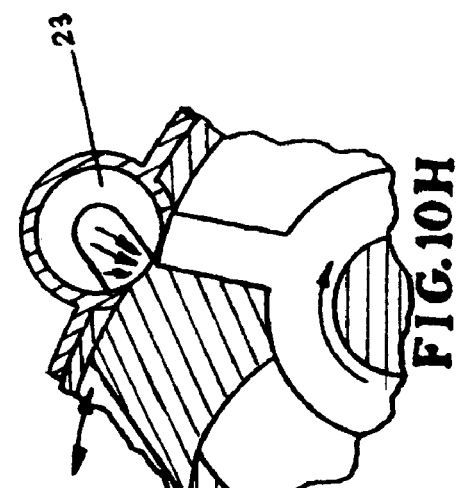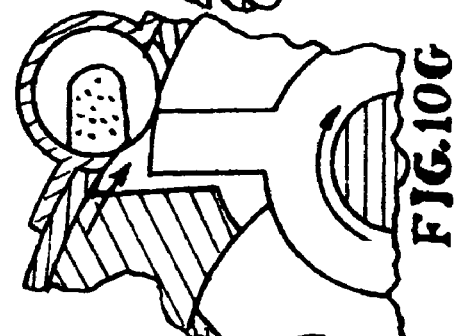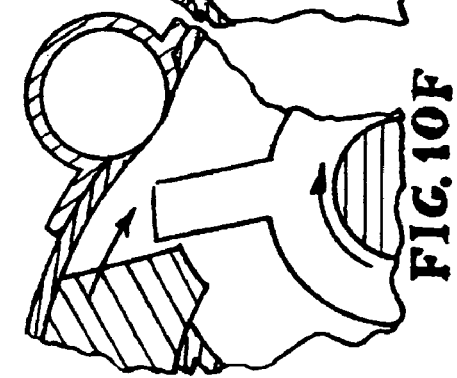

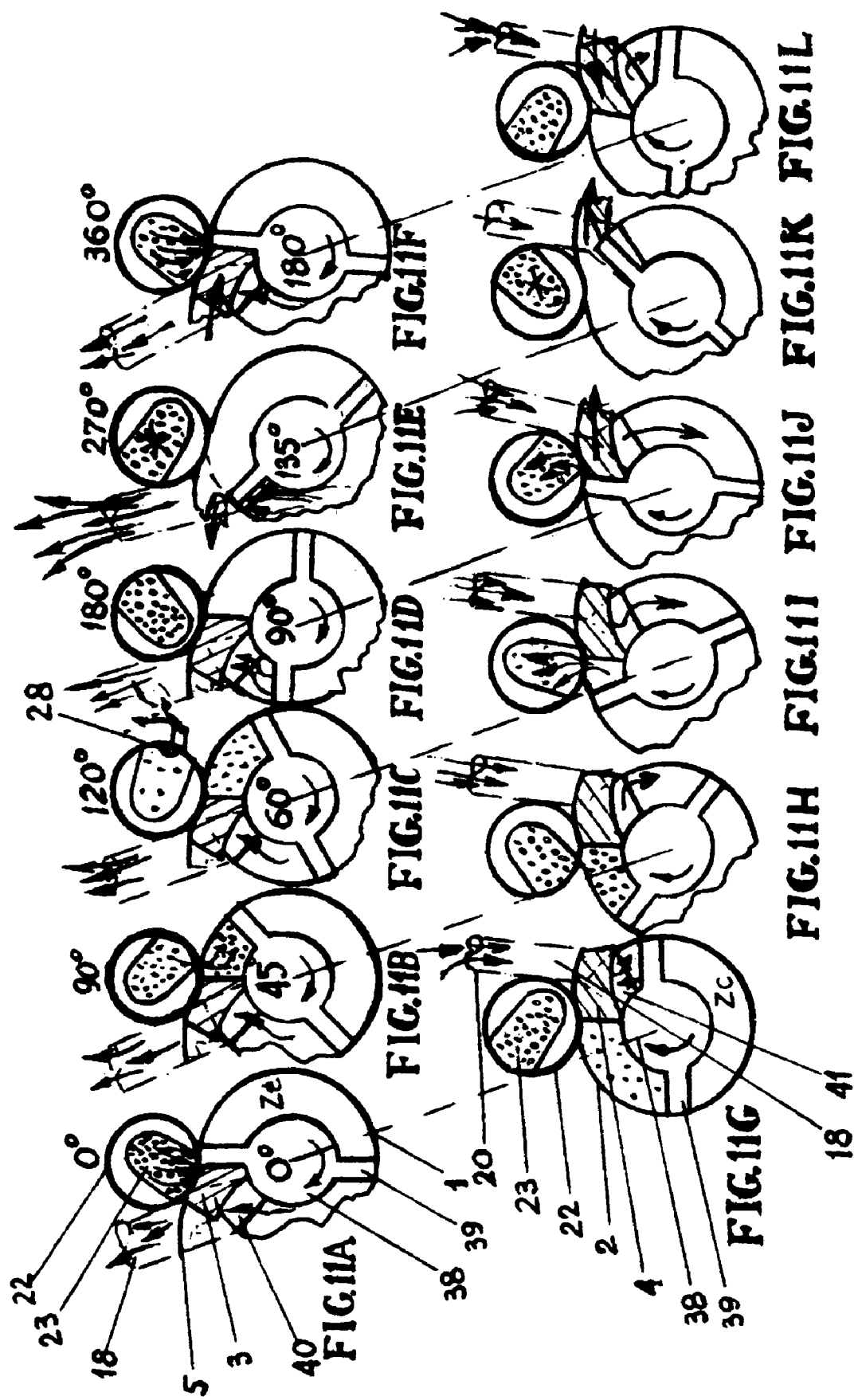

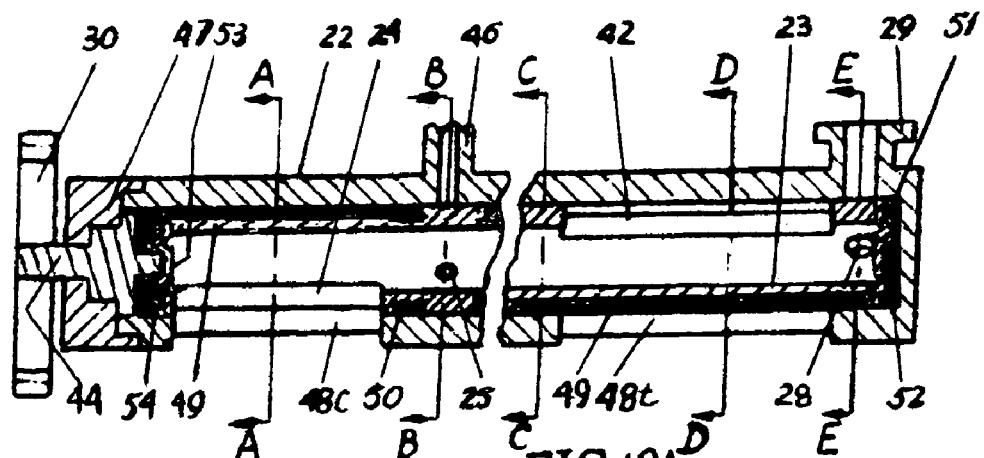
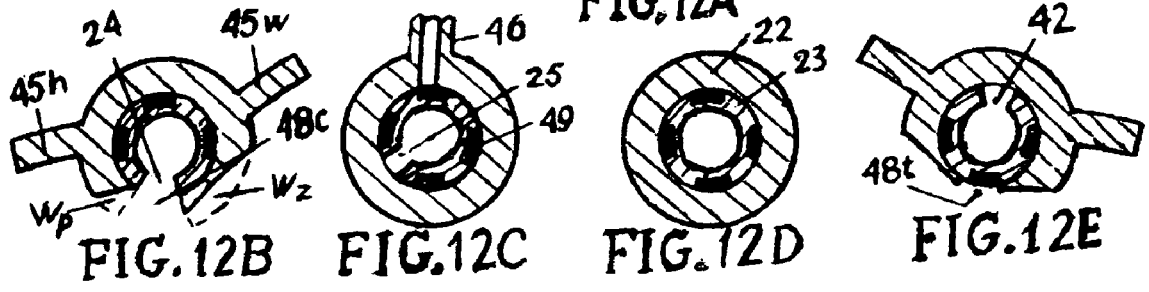
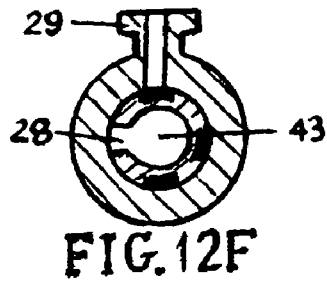
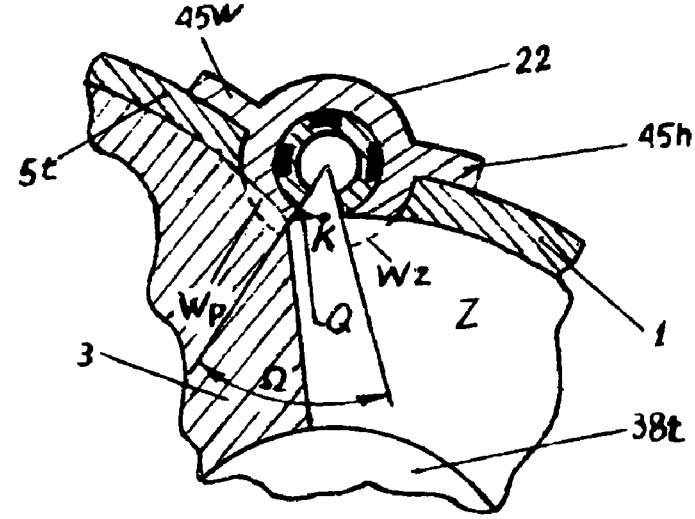
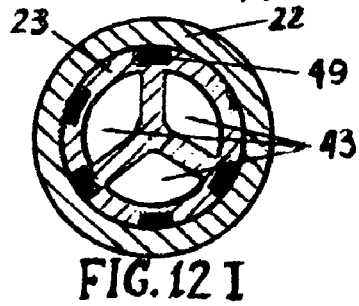
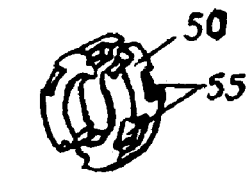

K.ENGINE

CROSS REFERENCE TO RELATED APPLICATIONS

No related applications.

STATEMENT REGARDING FEDERALLY SPONSORED RESEARCH OR DEVELOPMENT

No federally sponsored research and development.

BACKGROUND OF THE INVENTION

1. Technical Field

The present invention pertains to internal combustion four-stroke piston rotary engines under classes: 123/41.4, 48, 80R, 190A, 204, 222, 225–231, 237–239, 241, 243, 244, 249 and 418/136, 246, 249 by the U.S. Patent Classification Definitions and F02B 053/00-06 by the International Classification.

Related documents: Michael J. Moran & Howard N. Shapiro. "Fundamentals of Engineering Thermodynamics". 1988; "Basic Thermodynamics: Elements of energy Systems" Skrotzki, 1963; "Diesel and high compression gas engines" 3rd edition, Edgar J. Kates & William E. Luck, 1974.

2. Description of Prior Art

There are three main types of prior art internal combustion engines (ICE) that are discussed here:

Conventional Reciprocating Engines (RE);
Gas Turbine (GT);
Combined Piston Rotary Engine (COMBINED PRE).

RE: The first Otto and Diesel REs had 4–6%, recent ones have 35–45% efficiency, and that is a dead end. The limitation cannot be surmounted in principle, only small additions for a great expense. In reality, 12–16 valves, new oils, fuel & fuelling add price rather than efficiency. Objective necessity to find progressive substitute have ripened, but no alternative yet.

Mean while, technology and science experience is growing. The knowledge of rich RE's HERITAGE helps to form main principles of future ICE engine.

The partial analysis of the heritage is given below:

1. In RE pressure and volume of CH vary following the piston movement. As a result the speed of burning lowers from "burst" until "kerosene lamp"; combustion is not full. Limited by danger of a back blow Advance of an Ignition gives limited effect. Idea introduced in U.S. Pat. No. 5,010,860 is good, but drawback is too big 720 degrees of Advance of an Ignition. The optimal diapason is much less.

Conditions of durability and sealing stipulate limited initial air pressure. In result speed of burning is low, and combustion is not full.

CONCLUSION: for the best burning, volume of CH must be constant and independent of piston movement; air pressure must be at its possible high; time for combustion must be optimized.

2. In RE the same cylinder gives room for suction, burning and expansion, combustion materials retain in the cylinder and burning fresh air-fuel mixture is not efficient.

CONCLUCION: stroke spaces have to be separated to perform only specific function: sucking, expansion and combustion and CH has to be cleaned up before fresh air charge.

3. In RE compression and expansion take place in the same volume, and gas energy is utilized incompletely: thus high-energy gas exhausts out with harm materials and high sound.

CONCLUSION: for higher efficiency, compression and expansion volumes have to be different with ratio $Rv=Vt/Vc>1$, where $Vt$—volume of expansion; $Vc$—volume of compression.

4. RE cannot be adapted for effective operational optimization of nominal power; throttling doesn't solve the task: specific fuel consumption is higher then in optimal regime. The problem may be solved by way of displacement volume regulation, what is problematic in RE.

For instance: in case of an automobile, higher power of all cylinders is needed in short-term periods (5% of operational time). Other time customer pays extra money for "store" of the power with its inevitable extra fuel consumption.

The regulation will allow obtaining new optima engine to secure only "demand" power for overcoming friction and aerodynamic resistance instead of idle "Work for himself".

Additionally, launching of engine with operatively reduced displacement volume in some outward conditions is much lightly then with a big one.

CONCLUSION: for fuel economy and lighten of launching would be useful an adaptation of an engine for operational displacement volume regulation by turning off & on part of the engine cylinders.

5. RE practice shows that cylinder-piston pair is a sufficient combination to get high ratio compression and expansion if there is no stray air volume in cylinder, but complex crankshaft structure and imperfect valve mechanism with rocker-spring drive and penetration valves into cylinder confine full possibilities of a said pair.

For RE rotary valves idea is good (U.S. Pat. No. 4,381, 737; U.S. Pat. No. 6,321,699 and other under class 123/41.4, 80R, 190A) but it solves a partial problem, not in complex, and didn't take roots.

CONCLUSION: there is preferably to use piston-cylinder pair with simplified shaft and valves drive, both on rotary base and without extra stray air volumes in cylinders.

6. For more than 100 years of RE experience main principles of ICE and its function components were defined. In result many of the most reliable and functionally fit systems and elements have obtained standardized principles of design and operation.

CONCLUSION: it is preferable to use standardized elements of RE adapted for new work conditions in new engines.

7. Today RE with its huge assortment dominates in autonomic power applications.

CONCLUSION: new engine must have no less then RE assortment.

SUMMARY CONCLUSION: to satisfy contemporary market substitute of RE must possess higher efficiency, must be simpler, smaller in size, more reliable and cheaper, must be adapted for optimization of nominal power by displacement volume regulation for fuel economy and better launching, must be built on piston-cylinder principle with a high compression ratio, must have expansion volume exceed the compression one and to allow no less then RE assortment.

GT: There is a rotary ICE with practical history for about 60 years. In comparison with RE design GT is much simpler, torque is bigger and more uniform; scheme is built of separate C, T, CH, and efficiency is more.

Nevertheless, GT is a vane, not a piston machine and cannot reach high compression ratio; GT has limit diapason of work regimes under conditions of vanes' profile. Therefore, GT generally is in use for objects with predominantly stationary work regime, they are noisy, expansive, and cannot compete with RE by size.

CONCLUSION: the substitute of RE preferably has to repeat a design of GT as a rotary engine with separate elements C, T and CH for higher efficiency, but retain piston-cylinder principle for higher compression—expansion ratios.

There is a class of engines comprising elements of GT and RE and plenty of speculative ideas; first Piston Rotary Engines were published simultaneously with first RE, but until now not one rotary engine was built as alternative to RE by the following reasons:

Inventions solve partial task often for the sake of originality instead of simplicity (U.S. Pat. No. 6,276,329 there are too complex drive of the partition and great stray air volumes in cycle strokes; U.S. Pat. No. 6,298,821, good idea was not logically completed);

Many inventions have complex design of rotors comprising additional movable elements: U.S. Pat. No. 6,688,276 B2, U.S. Pat. No. 6,247,443 having staggered pivoted elements, sliding vanes or mounted on rotors). Drawbacks of the inventions are the following:

Complex design leading to low reliability and operational inconvenience;

Typical drawbacks of REs where the same cylinder consequently performs all cycle strokes;

Cannot be reached fullness of combustion, Principle of Advance of an Ignition (AI) cannot be used, U.S. Pat. No. 6,276,329 with separated Combustion Chamber (CH) doesn't solve the problem.

Not one invention solves problem of cleaning of the CH.

An overcoming of all the drawbacks is possible in COMBINED PRE built on principle of GT: there is scheme with separate C, T and CH, but only a few inventors mark importance of it: (U.S. Pat. No. 6,298,821 B1 apart from CH; U.S. Pat. No. 6,606,973 B2: separate C and T; U.S. Pat. No. 4,909,208: CH combined with valve mechanism, There are good ideas but bad lacks under pp 1, 2, 4, 6 of RE HERITAGE);

CONCLUSION: COMBINED PRE with separate C, T and CH is the best substitute of RE.

Complex idea of such substitute for the first time is given in KE.

BRIEF SUMMARY OF THE INVENTION

KE is a rotary engine, hybrid RE and GT in thermodynamics and design.

In Thermodynamics:

KE practically realizes left part (compression & combustion) of an ideal Otto RE cycle with burning air-fuel mixture in real constant volume. The combustion is full because it doesn't depend on other processes in the cylinders; compression ratio is high (20 for first KE; 40+later); a forced ventilation acts before fresh air charge; any reasonable AAI is available.

The AAI as allowed duration of burning gets up to 540 degrees of shaft turn (for reference: in RE the advance is no more 25 degrees of shaft turn and it is one of the strongest confines of RE speed, power and efficiency as common index).

KE also practically realizes the right part (expansion) of ideal Brayton GT cycle because design ratio in KE is $R=Vt/Vc \gg 1$, where Vt-volume of expansion (T) and Vc-volume of compression (C). Special modifications a KE may be built with wide range of the expansions.

P-V summary diagram shows higher thermal efficiency of KE then each one of RE's and GT.

In Design:

Design scheme of KE repeats one-shaft GT with separate C, T and CH.

Displacement volume of turbine is $R \gg 1$ time more then one of a compressor; it gives a fuel economy, more harmless and noiseless exhaust.

Instead of vanes, C and T are piston aggregates with traditional for PRE staggering partitions dividing annular channels for section that are function analogs of RE cylinders.

The partitions C and T are mounted on pivoted levers. It excludes a wry and provides levering (i.e. choice of an optimal power shoulder) the partitions to optimize parameters of control means that are adequate in C and T.

Said control means secure a synonymous position of the partition relative to served piston.

As the result, casual impacts of the pistons and partitions are impossible, and their mutual positions submit to a set up program. For instance, final of compression and a beginning of expansion strokes occur when contiguous surfaces of a partition and a piston coincide. The points correspond to zero cylinder volumes. In C it makes any compression ratio $\Pi$ available depending only on volume of CH and stray air volumes: the less said volumes, the more $\Pi$. Presumably, $\Pi$ of first KE will be 20, and next 40 and more.

In T said zero volume eliminates expansion thermodynamic losses.

The partitions get movement through intermediary of integral (undivided) and detachable arms.

Detachable arms have switched balance locks. When the switch is "ON" the arm is locked as undivided one and the partition gets movement; when "OFF", the arm is separated, partition stops in up position and gives free pass for pistons. At that time the cylinder with its displacement volume becomes out of work. That is the way of displacement volume regulation.

Aim of the regulation is optimization of nominal power for fuel economy and additionally for lightening start of engine. For instance, track equipped with 6 liter RE in stationary regime 60 mph "spends" 1 gallon of fuel per 18 miles if unloaded or per 10 miles if loaded. Same track equipped with the KE with said regulation will spend one gallon per 60 and 40 miles correspondingly. A computer can perform the regulation on a run.

KE is equipped with plurality of replaceable CHs.

Separated CHs are unified with rotary valve mechanisms and comprise oblong cases with revolving thermoelastic inside bodies; valve opens when openings of said case and inside body coincide and vice versa. Said cases are mounted outwards of C and T and firmly keep all the design of KE. Every inside body has one or more combustor, so every CH may contain one or more of combustion units working successively.

CHs have regimes of forced ventilation of every combustor before the fresh air charge.

For fuelling there is a common nozzle in every CH's case and reply holes in combustors.

Common nozzle is joined with block of number of fuel injectors working by turn to secure high frequency fuelling. The injectors are similar to standard RE injectors adapted for high fuel and counter air pressure due to compression ratio 20, 40 and more.

Described invention represents endless range of KEs family differing by size, power, work conditions, specific technical parameters. KE as a substitute of RE and GT opens a way for diversity of modifications to satisfy contemporary and future markets of economy and clear power sources.

In comparison with RE and GT described KE has following advantages:

less geometrical and weight parameters on the same displacement volume;

torque is bigger in size and uniformity;

less fuel consumption; more harmless and noiseless exhaust;

simpler manufacturing and operation;

more reliable; better balance;

wider and smoother adjustment abilities;

wider application and modification ranges.

BREEF DESCRIPTION OF THE DRAWINGS

FIGS. 3A and 3B represent is a two-projection view of KE.

FIG. 4 shows control wheel with control rails on its both sides.

FIG. 5A is view of lever, detachable arm and balance lock.

FIGS. 5B & C show detachable arm in two states: locked (the arm works as undivided arm) and unlocked (the arm is detached, upper arm is fixed to support) correspondingly.

Figure 2:
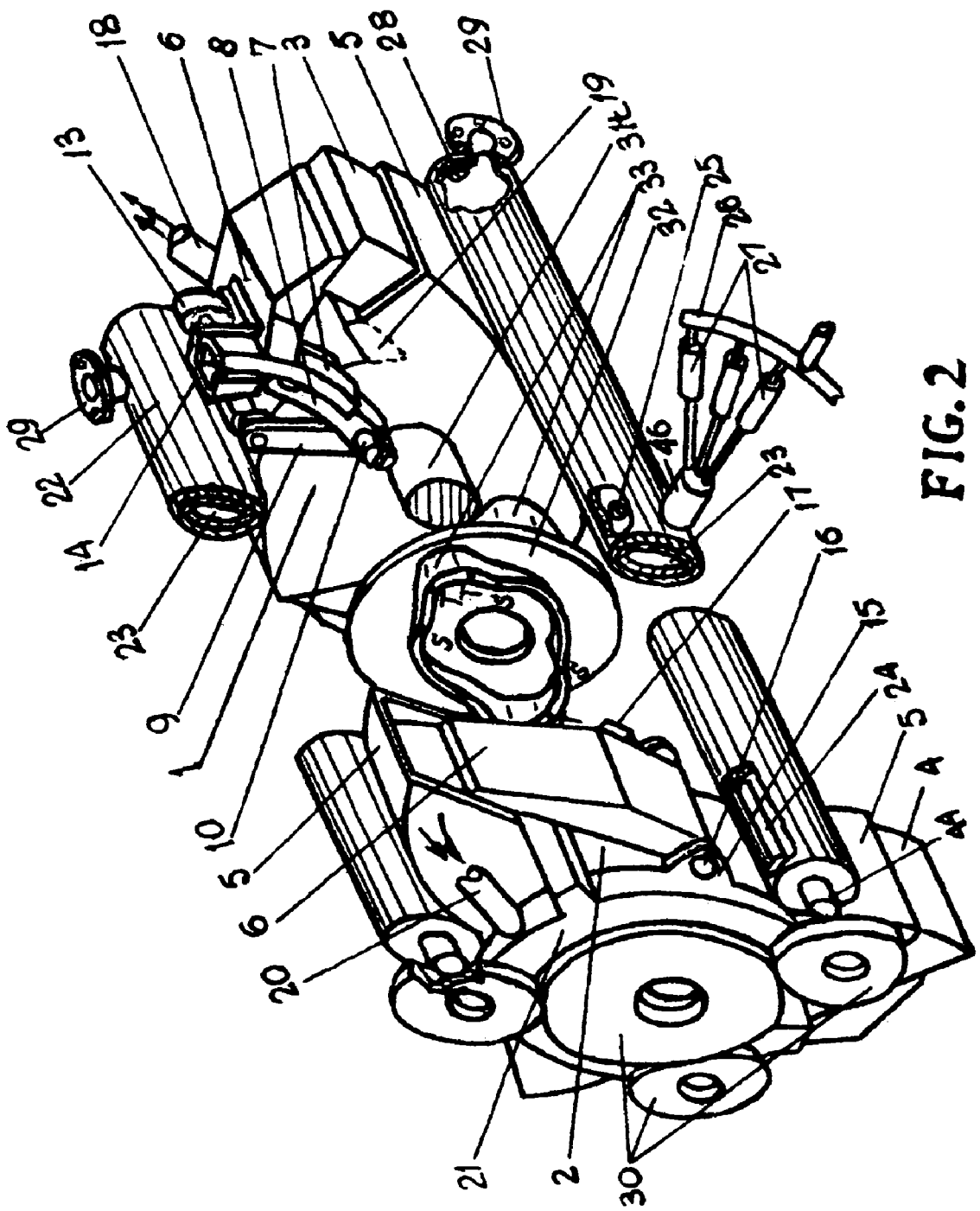
FIG. 2 shows conceptual design of KE embodiment.
Figure 6A:
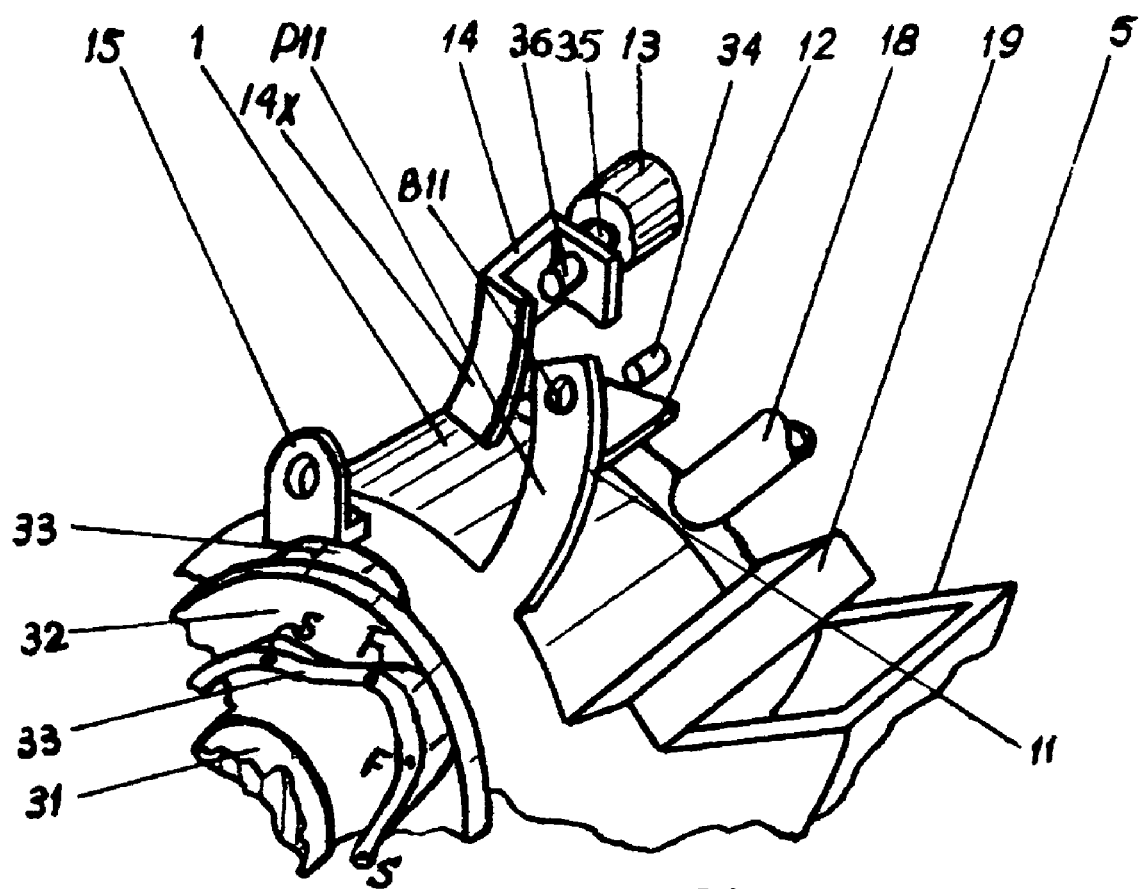
Figure 6B:
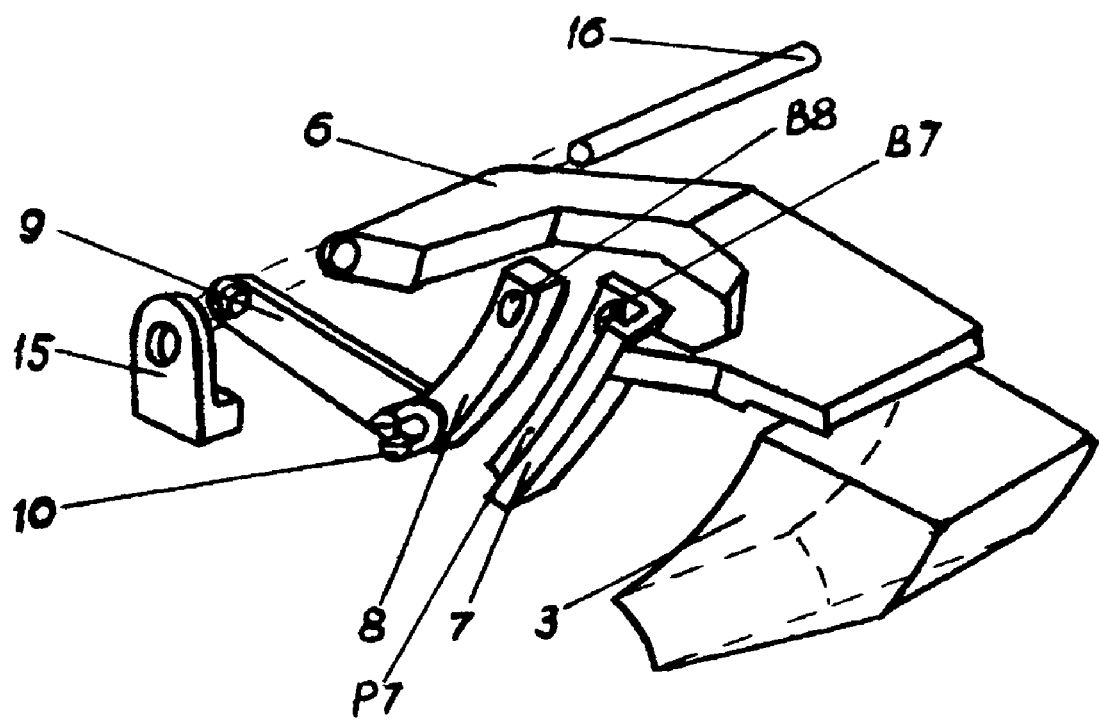

FIGS. 6A & B show stationary and mobile elements of detachable arm, lever and partition apart, view in assemblage represented in FIG. 2.

FIGS. 7A, B & C show event when detachable arm is locked and partition successively takes positions: closed; open; closed—according to revolution of control wheel.

FIGS. 7D, E & F show event when detachable arm is unlocked: upper arm and partition are stopped in upper position; lower arm is staggering idly.

FIGS. 8A & B illustrate cut sections of turbine and compressor of KE by scheme 2×3×1.

FIGS. 9A to H illustrate successive mutual movement of a piston and a partition in compressor just the end of compression stroke: the piston touches the partition, combustion chamber gets last charge and shuts, and the partition "flees" to let through the piston. After piston through, the partition shuts again.

FIGS. 10A to H illustrate successive mutual movement of a piston and a partition in turbine Just before expansion stroke and its very beginning: a partition opens and lets through to an approaching piston; after piston passes, the partition catches the piston until mutual touching and simultaneously shuts a cylinder. At the moment combustion chamber opens exit for combusted gas and expansion stroke is beginning.

FIGS. 11A to L explain creation of analog of advance of an ignition on two-piston sample. The illustrations show consequent mutual movement of partitions, pistons and revolving inside body of combustion chamber.

FIG. 11C shows moment of forced ventilation of a combustor.

FIGS. 12A to J show combustion chamber of alone, two and three FIG. 12I combustors, sample of montage (FIG. 12G) and double semi-ring (FIG. 12J) seal element.

DESCRIPTION OF THE PREFERRED EMBODIMENT

KE is a four-stroke piston engine. Thermodynamic cycle of the engine is combined and more efficient then initial traditional for such engines cycles: Otto, Diesel and Brayton.

Figure 1:
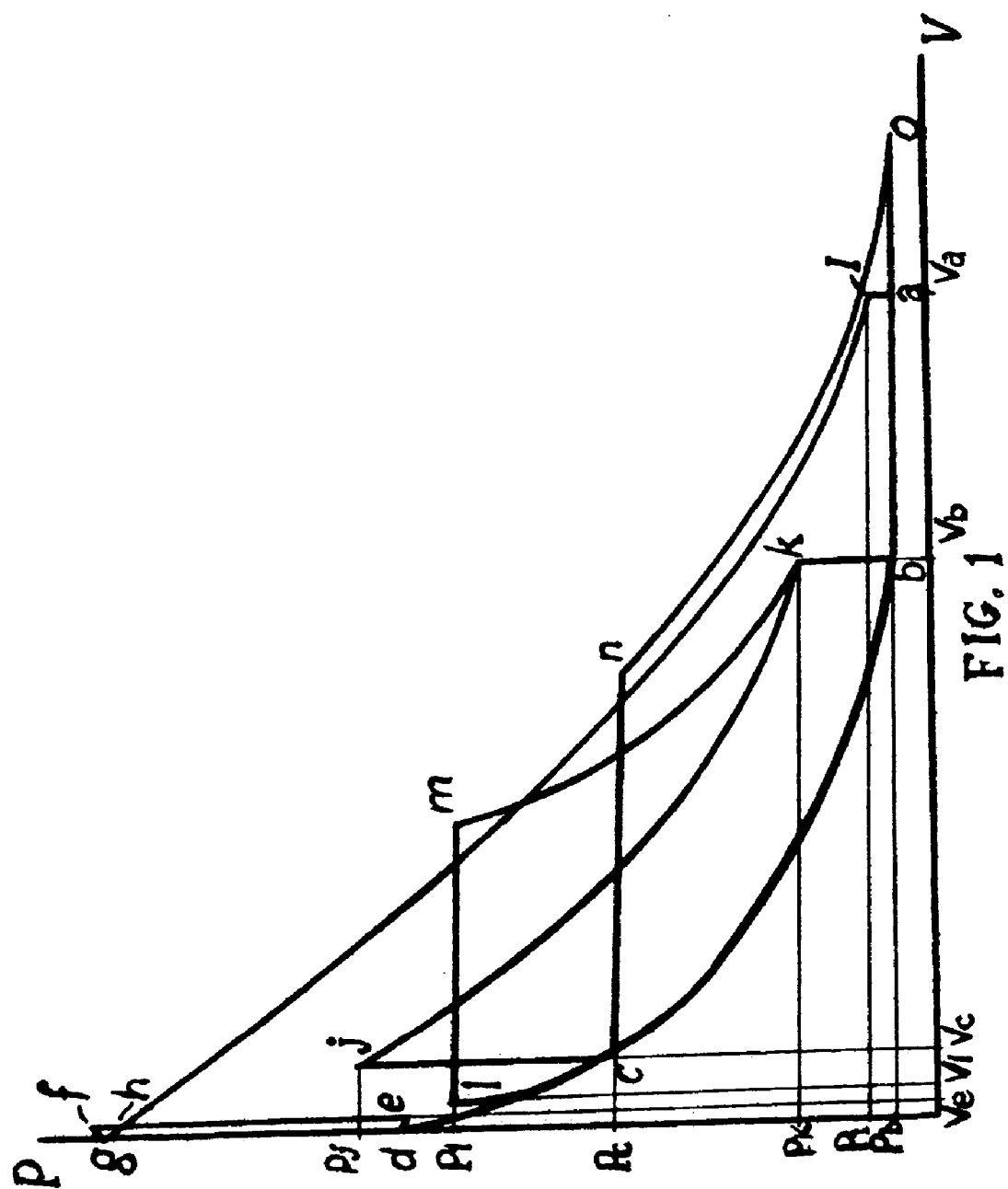
FIG. 1 is qualitative united presentation of ideal air-standard P-V diagram Otto, Diesel, Brayton and KE cycles.

All these air-standard ideal cycles are introduced on united P-V diagram of FIG. 1. Here contour b-c-j-k-b represents Otto, b-c-l-m-k-b Diesel, o-a-b-c-n-o Brayton, and a-b-c-d-e-f-g-h-I-a KE cycles.

Comparison of left parts of Otto and Diesel diagrams shows: Vl<<Vc, and Pl>>Pc, but Pj>>Pl. It means that combination of higher compression ratio (Diesel) with high-speed constant volume combustion (Otto) may give more efficient process if to realize following:

to organize real burning process in combustion chamber with constant volume (as in ideal Otto cycle) and to make the volume independent of piston motion;

to rise the burning speed and final pressure in combustion chamber.

By reason of design scheme reciprocating engines don't fit for above realizations.

Comparison of right parts of Otto-Diesel and Brayton diagrams shows: Vo>>Vb and Po<<Pk. So, to get better efficiency it is necessary to provide expansion ratio more then it is in Otto & Diesel engines. It may be solved in an engine with separate aggregates where each one performs certain thermodynamic function independently, without influence of other aggregates.

That thermodynamic-design conception was realized in GT, but under a number of reasons of vane compressor and specific CH it is impossible to get high compression ratio and constant volume combustion in GT.

Defects of RE and GT are eliminated in KE comprising of a separated piston compressor, combustion chamber and a piston turbine.

Resulting real cycle of the KEis a hybrid with left part: a-b-c-d-f-g-h what is an improved ideal Otto cycle with high compression ratio, and a right part: g-a what is ideal Brayton cycle for piston (not vane) turbine. Indeed, piston machines have to provide a few surpass above the atmospheric pressure in the end of expansion stroke to avoid energy loss for forced removal of burned out gas from cylinder.

Improvement of a left part of P-V diagram led to the following advantage features of KE:

volumes of cylinders in the end of compression and before expansion strokes (analogs of upper dead centers) are equal to zero. It becomes possible due to the special arrangement of work cylinders, partitions, pivoted levers and control means which allow to reach any high compression ratio depending only on volume of combustion chamber and leakage of sealing;

combustion chambers are separated, and burning process goes independently of movement of a piston in a really constant volume. Now replacement of combustion chamber to repair, improve or set up new parameters engine is possible.

process of burning is organized to secure higher speed and completeness of combustion by the following ways:

compression ratio is more then in Diesel cycle: in first engines it will be in diapason 20–30, latter the ratio is presupposed to be enlarged until 40 and more;

combustion chamber is actively ventilated from combustion materials;

any reasonable time may be given to complete the combustion. It is significantly developed analog of "Advance of an Ignition" in RE;

combination of combustion chamber with rotary valves arrangement led to minimization of stray air volumes and losses by reasons of "air springs" (energy spent for pressing stray air bag if any will not be utilized and is lost). The losses are represented by triangle f-g-h and for the first time we neglect them.

Dynamic qualities of rotary valves are much better because of no influence of inertial forces.

Improvement of a right part of the P-V diagram led to separating the compressor and turbine in distinct aggregates with design ratio R=Vt/Vc>>1, where Vt-effective displacement volume of T (expansion/exhaust strokes), and Vc-effective displacement volume of compressor (compression/suction strokes).

In traditional RE R>1 is impossible, but in separate compressor and turbine of KE it may be done in wide diapason as one of design parameters.

Note the following:
represented cycles are air-standard without intake-exhaust loops; scale of P-axis is non-linear;
"piston & cylinder" in K.Engine do not pertain to geometry shapes. They have "curved axles", not circle transversal cut and reflect functions of the objects;
term "turbine" of K.Engine means piston power aggregate;
"effective displacement volume" means real work volume of cylinder. It is volume of passage in annular channel between adjacent partitions minus auxiliary volumes bordered by one of the partitions and apertures;
"equivalent cylinder" means analog of traditional cylinder of reciprocating engine (reminder: functions of one traditional cylinder in K.Engine are divided in compressor and turbine, therefore one traditional cylinder is represented by couple of certain cylinders plus corresponding to the cylinder partitions. Thus, one couple of the certain turbine and compressor cylinders represent alone "equivalent cylinder");
abbreviations are the following: C—compressor; T—turbine; ICE—intake combustion engine; RE—reciprocating engine; GT—gas turbine; PRE—rotary engine; KE—K.Engine; CH—combustion chamber; H—compression ratio; AAI—analog of advance of an ignition.

More then 100 years of ICE experience shows that not only thermodynamic qualities define its fitness for applications, operational ones are important as well.

In order to improve operation characteristic of ICE both in fuel economy and enlightens engine start for the first time KE realizes ability of nominal power regulation by way of displacement volume change without retard resistance (brake) effect. Throttling doesn't solve the task: specific fuel consumption after throttling is higher then in corresponding optimal regime.

Design of KE is illustrated in FIGS. 2 to 12.

The engine contains separated T and C comprising stationary housings 1 and 2 (FIGS. 2 &3A), individual rotors 38t and 38c with pistons 39t & 39c set up on the shafts. Pistons 39 sweep inside annular channels Zt and Zc of said housings (FIGS. 2, 3A, 8 to 12), Shafts 31t & c are jointed by means of standard coupling disposed in space between said T and C (not shown), Displacement volumes of KE's turbine is more then the one of a compressor to provide said ratio R=Vt/Vc>>1. It gives fuel economy, more harmless and noiseless exhaust.

Present description reflects embodiment with ratio R=Vt/Vc>1 giving maximal efficiency.

It was done by choice of linear size of turbine along the shaft 31t more then the size of pressor (compressor and turbine have geometrically identical rotors, pistons and partitions in transversal cuts, and only linear sizes identify difference of displacement volumes).

Partitions 3 and 4 hermetically divide said annular channels on separate cylinders for execution expansion-exhaust strokes in turbine and sucking-compression strokes in compressor. Said partitions are mounted on peripheral edges of pivoted levers 6. The levers are fixed on axles 16 placed in brackets 15 (FIGS. 2, 3A&B, 5A, 6A&B, 8A&B). So, the partitions accomplish arc-view reciprocating movement, and wells 5 have arc-view shape too, This design excludes wry of a partition in a well and secures synonymous transmitting program movement from control means 32 & 33 through arms 7, 8, 17 (FIGS. 2, 3A&B, 6B, 7A to 7C, 8A, 8B) to the partitions.

External sides of arc-shape wells 5c (compressor) and 5t (turbine) have opposite direction (FIGS. 3B, 8, 9, 10). Correspondingly, axles of pivoted levers 6 of C and T are oriented differently about direction of revolution of shaft 31: axle of T lever is disposed behind its partition 3, and axle of C lever is disposed ahead of its partition 4.

By this design different mutual itineraries of partitions and pistons were created: in T they are gathering in a "point gathering"; in C they are diverging from common "point of diverging".

Owing to this design the following becomes possible ((FIGS. 10 A to H, and 9 A to H):

in T, at once after a free pass a piston partition "catches" said piston just before expansion stroke so that said partition and piston have full short-term contact of contiguous surfaces (point of gathering). After said contact the partition is stopping and the piston "flees";

in C just at the end of compression stroke at once after contact between partition and piston (point of diverging) partition "flees" and gives free pass for piston.

Zero initial volume before expansion stroke gives more efficiency; zero volume at the end of compression stroke gives both more efficiency and allows getting any compression ratio depending only on volume and leakage of CH.

Number of partitions Nc in C is equal to number of partitions Nt in T. Every C partition corresponds to sole T partition; together they represent a couple serving "equivalent cylinder". Both the partitions of the couple are united with only CH 22. Common number of the chambers is equal to number of equivalent cylinders N=Nc=Nt.

Number pistons Pc in C and Pt in T is the same P=Pc=Pt, and depending on KE scheme may be P=N, or P<N, but never P>N to avoid simultaneous presence of two and more pistons in one cylinder because of the space between the pistons is "dead" where compressed gas does not work.

C has aside of housing 2 a fresh air collector 21 with air intake port 20 (FIGS. 2 & 3A); T has aside of housing 1 an exhaust gas collector 19 with outlet port 18 (FIGS. 2 and 3A & B); the annular channels have apertures 40 and 41 (FIG.11) connecting inside volumes of the cylinders with the collectors.

Program movement of partitions is served by control means comprising control wheel 32 with control rails 33 on both sides of the wheel, detachable and undivided lead arms 7, 8, 17 (FIGS. 2, 3, 4, 6A, 7A to 7C, 8). For design compactness of introduced KE, the control wheel is common for both C and T and is disposed between housings 1 and 2; in modifications control means may be mounted individually for T and C.

Represented control wheel 32 has smoothly curved control rails 33 on both parallel sides (may be ridges, grooves, tooth profiles etc.). Left rail serves C; right one serves T (FIG. 3A). The wheel is mounted on standard coupling joining shafts 31t & c (not shown).

Point S with angle α (FIG, 4) marks a transition "from and to" smallest diameter d; point F with angle β marks a transition "to and from" the biggest diameter D of the rail 33.

The less angles α and β are, the smoother the transitions are and the less Δ=(D−d)/2, but diapason S—S is bigger. Sometimes it's undesirable; optimal demands vary for different KE.

Angle γ in FIGS. 10D and E shows angle pause between opening and closing of partition 3 for free pass of T piston 39t; angle ε in FIGS. 9 D and E shows angle pause for free pass of C piston 39c. The pauses correspond to linear sizes of diapasons F—F of control rails, and in common case they are not equal for both rails.

Control means transmit command program movements to the partitions strictly in accordance with position of a piston. Because a piston and control wheel are hardly fixed on common shaft, their mutual position is invariable. So, every piston by its motion "itself" controls an every partition on its way by individual program of "its own" local curvature of a control rail. It guarantees reliability and allows KE arrangement with symmetrical and asymmetrical position of pistons and partitions to widen diapason of the engine's adjustments.

The transmitting of the movement is carried out from shaft 31, control wheel 32 and control rails 33 to carriages 10, arms 8 and 7 of detachable arms or undivided arms 17 to staggering pivoted levers 6 and finally to partitions 3 and 4 (FIGS. 2, 3A, 4, 6B, 7A to C, 8).

Said lead arms 7 and 17 are attached to levers 6 in certain points located between axles of said levers and partitions on particular radius "r" from said axles (FIG. 8A). It was done for optimization of geometry parameters of control wheel and rails. Radius "r" defines power shoulder of lever 6 and is the same for every lever.

To build curved profiles of control rails the method of selected points was used.

Outside diameter D of control wheel 32 was selected on conditions to have enough room for free revolution of the wheel in space limited by housings 1, 2 and Ch 22 (FIGS. 2, 3). (For reference, distance between housings must be enough for unhindered motions of the wheel 32 with rails 33, carriages 10, arm 7, 8 and 17. For instance in small and medium KE, its equivalent to RE with displacement volumes under 6,000 liters D does not exceed 6–7 in. (150 to 170 mm), and the distance between housings is 2.5–3 in. (60–80 mm)).

In the method of selected points border points S, F and intermediate points are built departing from the following:
- said diameter D;
- initial and ultimate positions of partition when it is closed and open;
- initial and ultimate points of a piston when a partition begins opening, waiting and closing;
- maximal angle step of a piston to go closely to partition, but without mutual contact between said initial and ultimate positions;
- initial moment for C when piston and partition have full contact of adjacent surfaces as beginning of the "fleeing" of the partition (point of gathering) (FIG. 9A to 9H);
- final moment for T when partition "catches" the piston until full contact, and the piston begins the "fleeing" from the partition (point of diverging)(FIGS. 10 A to 10H);
- lengths R of lever 6 and power shoulder "r" (FIG. 8A);
- location of axle 16. It may be on, above or below of peripheral surface of housing.

Said control rails 33 through carriages 10 situated in constant connection with lower arms of detachable arms and with undivided arms 17 (FIG. 8).

Detachable lead arms allow an important option—regulation of KE's displacement volume.

They allow turn off/on work cylinders without retarding resistance (break) effect. Executive elements are the partitions.

The aim of the regulation is fuel economy and facilitating of a KE's start. It may be done "on a run" depending on the engine loading and necessary power.

Both partitions of alone equivalent cylinder must be identically equipped and controlled Under conditions of equipping: if in KE built by 2×3 scheme (2 pistons and 3 equivalent cylinders) (FIG. 8) C is equipped with two detachable of three arms (Dc=2, and third lead arm is undivided one) to serve both partitions in wells 5ac and 5bc (FIG. 8B), then T must have identically two detachable arms (Dt=2) of the three serving corresponding partitions in wells 5at and 5bt (FIG. 8A).

Under conditions of controlling: if arm of partition in C well 5ac is detached (turned off), then arm of corresponding partition in T well 5 at must be detached too (turned off).

In multi-cylinder KE built by scheme P×N the number of detachable arms D=Dc=Dt may vary from D=0 to D=N. last makes sense to widen adjustment row if displacement volumes of single cylinders are not equal.

For instance, if in scheme 2×3 (FIG. 8) D=3 (not D=2 as shown at the FIG. 8), and displacement volumes Vc of single equivalent cylinders led to displacement volumes of traditional RE are different and equal to 400, 500, 600 cubic sm. then program regulation of the arms gives the following adjustment row of work displacement volumes led to RE Veqv (below designations Vc and Veqv are explained in details): 400; 500; 600; 800; 1000; 1200; 1100; 1200; 1500; 1600; 1800; 1900; 2000; 2200; 2400; 2500; 3000; 3400; 3600; 3800; 4000; 4500; 4900; 5000; 5500; 6000 cubic sm.—26 events.

If every equivalent cylinder has same displacement volume of 500 cubic sm. then only two detachable arms (D=2) are needed for effective change of displacement volume, and the row is: 500; 1000; 1500; 2000; 2500; 3000; 3500; 4000; 4500; 5000; 5500; 6000 cubic sm.—12 events.

So, contemporary track with RE 6,000 liters spends one gallon of fuel per 18 miles if unloaded or one gallon per 10 miles if loaded.

With the said regulation said unloaded track equipped KE may get rid of extra power of 6.000 liter motor and be quite "on the run" with 1.800 liter motor when starts and goes "up", and 1.200 liter when runs by even road in the long-term economic regime 60 miles per hour. In a long-term idle regime it is enough to assign 0.400–0.500 liters of engine.

A computer can perform the regulation on a run.

With factors of higher efficiency and displacement volume regulation said unloaded track with KE will spend one gallon per 60 miles, and loaded track will spend one gallon per 40 miles.

A detachable arm (FIGS. 2, 3, 5A to 5C, 6, 7, 8) contains upper 7, lower 8 arms and pin 34. Upper arm is constantly attached to lever 6; lower arm is constantly connected with control rail 33 through carriage 10 and staggers about axle 16 with help of consolidated pendulum 9. Pin 34 unites or detaches out arms 7 and 8. When the arms are united they work together as undivided arm 17.

When the arms are detached, upper arm stops in upper dead center and lower arm makes idle staggering. FIGS. 7A to C illustrate consequent motions of united arm during partial revolution of shaft and control wheel; FIGS. 7D to F shows detached arms: arm 7 is stopping; arm 8 moves idly.

A special balance lock means unites or detaches arms 7 and 8 with help of connecting pin 34 and caliber protrusion 36.

The lock is controlled by electrical commands through wires 37. The lock is mounted on bracket 12 of support 11 and comprises solenoid 13 with a push rod 35 and clamp 14. Size and shape of external cheek 14x of the clamp 14 is so that its inside plane is work surface for slide of said pin 34. Said clamp 14 is fixed on a push rod 35 so that outside edge of the rod penetrates internal cheek and forms caliber protrusion 36.

When the arm is locked (FIG. 5B) push rod 35 is pulled into solenoid 13 so that cheek 14x is pressed to lower arm 8 and holds pin 34 in bores B7 and B8 of both arm 7 and 8. So the arms are joined; the pin slides between inside plane of the cheek 14x and plane P11 of support 11 and sequred against falling out. The caliber protrusion 36 takes at that time position that its outside edge levels with plane P11. So, the pin is unable to casually get bore B11 to stop the arm (FIG. 6).

When the arm is unlocked (FIG. 5C) the caliber protrusion 36 penetrates to bore B7, attaches arm 7 to support 11 and simultaneously pushes out the pin 34 from the bore. Outside edge of the caliber protrusion levels with plane P7; cheek 14x makes step outwards; pin 34 makes same step and detaches arms 7 and 8. Arm 7 is stopping in up position, arm 8 staggers idly, pin 34 retains in bore B8 and with arm 8 freely slides between inside plane of cheek 14x and plane P7 (FIG. 6).

Said balance lock performs its commands in the upper dead center when all three bores B11, B7 and B8 coincide and when speeds of all three arms 11, 7 and 8 automatically are equal to zero.

So, apparently for the first time, in KE simple and obvious method built on a natural principle of equality speed to zero in dead centers for unstressed switching over movable mechanical elements was employed.

The method excludes complex speed synchronizers and may be successfully applied in gearboxes and other mechanisms with changeable power connections.

Additional feature of KE is design of CH united with valve mechanism.

There is one or many of rotary CH (FIGS. 2, 3, 8, 9, 10, 11, 12) in KE.

The CHs have shape of oblong cases 22 fixedly mounted peripherally of housings 1 and 2 and firmly keeping all design of the engine together.

Every said case 22 has admission 48c and omission 48t openings, fitting caps 45w (well) and 45h (housing), fuel nozzle 46, ventilation hole 28 and flange 29 and sealing lead 47. Every CH has a revolving thermoelastic inside body 23 with alone or more combustors 43 (FIGS. 12A, 12H, 12J).

Every said combustor has openings and holes functionally and positionally adequate to openings and holes of said cases 22 so that theys during a revolution of said inside body periodically coincide with an effect of open valves (FIG. 12B) or in other period with an effect of closed valves securing such (FIG. 12E) regimes of CH as: phases of air & gas distribution; air-fuel mixing, ignition and burning getting of fuel and pressed air during any reasonable period as AAI, and forced ventilation before fresh air charge. The ventilation takes place by means of portion of preliminarily compressed air in volume equal or more of volume of the combustor through open both C's opening and ventilation hole 28.

Phase shift between C and T openings in combustor is less or equal to + or −180 degrees. The combustors have spiral shaped transitions between openings for securing above phase shift if the body 23 has more then a single combustor. Burning in combustors goes after compressive ignition.

FIGS. 12C and 12D schematically show CH of two and three combustors 43 (M=2; M=3).

FIG. 12A illustrates one-combustor CH with 180 degrees phase shift between admission 24 and omission 42 openings, holes 25 and 28 for fuel injection and ventilation respectively, and trailing edge 44 for drive gear 30 FIGS. 12B to F show crossections AA to EE respectively.

Case 22 has two openings 48c and 48t, four fitting caps 45w and 45h for montage the case on wells and housingsl and 2 (FIGS. 2 & 3), nozzle 46 for fuel injection, ventilation flange 29 and sealing lid 47. When openings 24 and 48c (same if 42 and 48t) are coinciding, it corresponds to traditional notion of "open valve".

FIG. 12G gives sample of montage of the chamber on T. All said above pertains to C too. Cylinder segments Wp and Wz adjacent to partition P and annular channel Z after mechanical treatment do not penetrate into inward spaces and do not prevent movement of partition and pistons.

To minimize stray air volumes (cavities Q) inside body 23 in position of closed valve and annular channel Z must have common point K where tangential planes are coinciding, and center angle Ω of openings 24, 42, 48c & t must be optimized. (Said cavities are responsible for energy losses introduced by triangle f-g-h of P-V diagram (FIG. 1)).

The inside body 23 is performed with longitudinal rectilinear and transversal circular grooves on external surface for sealing and lubricating stripes 49 and rings or double semi-rings 50 made of ceramic, graphite or other heat and abrasion resistant material. The rings and double semi-rings have precise side cavities 55 for penetration of said stripes to get better sealing (FIG. 12J).

Both edges of said body are corrugated diaphragms 52 for T and 53 for C. Both diaphragms have ceramic or graphite seals: right one 51(FIG. 12A) has diaphragm seal 52; left one 53 has double semi-ring seal 54. Intermediate double semi-ring 50 is given in FIG. 12J.

A replacement of the CH entirely or only inside body is available.

Sample of consequent phases of air & gas distribution depending on shaft 31, rotors 38c & 38t, pistons 39c & 39t and inside body 23 revolution is given in FIG. 11. The initial data is as following:

gears ratio is 2, i.e. inside body 23 makes two revolutions per one revolution of rotor;

phases of turbine and compressor pistons have difference of 90 degrees;

phases of admission 24 and omission 42 openings have same difference 90 degrees.

FIG. 11A shows beginning of expansion stroke: partition 3 just caught a piston; omission opening 42 is turned for very beginning of coming off gas from CH. The initial position is 0 degrees of T rotor and opening 42. Phase shifts of C rotor and admission opening 24 fall off for 90 degrees.

FIG. 11B shows T rotor and piston turned for 45 degrees. Expansion is continuous. In C opening 24 is closed yet, and piston preliminarily presses air. FIG. 11C shows 60 degrees of the turn. Omission opening 42 is closed, admission one 24 and hole 28 are open, and preliminary compressed air ventilates the combustor until the hole 28 is opened.

FIGS. 11D and 11J show final of the compression stroke: piston touches a partition, admission opening is open yet, and air under maximal pressure goes into CH. At once after that the opening 24 becomes closed the partition 4 begins "fleeing" from the piston to give him free pass. In T opening 42 is closed, compressed air is locked in combustor 43. Fuel from collector 26 through one of the injectors 27, nozzle 46 and hole 25 comes into the combustor, and burning begins.

So, 90 degrees of rotor turn is an initial moment of fuel mixture burning. In RE this moment corresponds to a point of 10–15 degrees before upper dead center in the end of compression stroke.

FIGS. 11E and 11K at 135 degrees of the rotor turn show routine process of air-fuel mixture burning and action of C partition 4 when it gives a free pass to a piston.

FIGS. 11F and L show position 180 degrees that is similar to initial one shown at FIGS. 11A & G Burning is ended and new expansion stroke with another piston is beginning.

All FIG. 11 show realization of AAI reaching up to 90 degrees in KE with certain phase shift of pistons and rotary CH with certain gear ratio and phase shift of openings. Choice of new conditions may result setting up another AAI. For it the number of combustors 43, gear ratio "i" and phase shifts of pistons and openings 24 and 42 vary by design.

Below table gives possible AAI for KE of 2×3 scheme and 90 degrees phase shift of the openings.

| No! | P! | Pistons phase! shift, degrees | M! | i! | AAI,! degrees |
|---|---|---|---|---|---|
| 1 | 2 | 0 | 1 | 2 | 90 |
| 2 | 2 | 0 | 2 | 1 | 180 |
| 3 | 2 | 135 | 2 | 1 | 225 |
| 4 | 2 | 135 | 3 | ⅔ | 225 |
| 5 | 2 | 0 | 3 | 0 | 360–400 |
| 6 | 2 | vary | 4 | ½ | 180; 360; 540*** |

***-depend on which combustor of 4 is charged just after the work cycle.

For reference, in RE AAI principally may not exceed 25 degrees due to the back blow.

The separate CHs united with rotary valves additionally give following advantages:

a burning takes place in constant volume independently of process in work cylinder;

active ventilation makes the burning more efficient;

not one detail penetrates into a cylinder and therefore any impacts are impossible;

revolution drive simplifies design and operation, secures a reliability and quickness higher than in a reciprocating drive;

losses are less because of better sealing, absence of springs and inertial forces;

modularity of CH allows its replacement entirely or only inside body for repair or setting up new parameters of KE.

Problem of quickness or work frequency of elements is sharp for rotary engines.

If in RE one work cycle in one cylinder takes place in two revolutions of main shaft, every cylinder of rotary engine performs P cycles per one turn of the shaft.

For instance, both RE and four-pistons rotary engines work in regime 5,000 turns per minute. It means that one cylinder of first performs 2,500 and second 20,000 cycles per minute. It is known that under conditions of fuel injection first has ultimate permissible regime in 10,000 runs per min (5,000 cycles in alone cylinder) when fuel injector distributes fuel properly yet. So, due to inertial forces and inevitable stops of fuelling in higher frequencies, alone standard fuel injector cannot secure fuel distribution in rotary engine with its 20,000 cycles per min, but system of four parallel similar to standard injectors working successively will be workable because every injector works in permissible regime. In KE due to high II (20 to 40) said fuel injectors have to be adapted for high air counter pressure.

Described above features represent not only KE but wide of family range of the KEs differing by size, power, work conditions, specific technical parameters in order to satisfy present market as substitute of contemporary RE.

Range of the KEs' family members is given below in the table:

| No! | P! | N! | Vc,.! | N led! | V led! | II! | R! | M! | D! | AAI! degrees! | k = 1! | Vc k 2! |
|---|---|---|---|---|---|---|---|---|---|---|---|---|
| 1 | 1 | 1 | vary | 2 | vary | vary | vary | 1 | 0 | up to 180 | | |
| 2 | 1 | 1 | vary | 2 | vary | vary | vary | 2 | 0 | up to 360 | | |
| 3 | 1 | 2 | vary | 4 | vary | vary | vary | 1 | 1 | up to 180 | vary | |
| 4 | 1 | 2 | vary | 4 | vary | vary | vary | 2 | 1 | up to 360 | vary | |
| 5 | 2 | 1 | vary | 4 | vary | vary | vary | 1 | 1 | up to 180 | vary | |
| 6 | 2 | 1 | vary | 4 | vary | vary | vary | 2 | 1 | up to 360 | vary | |
| 7 | 2 | 2 | vary | 8 | vary | vary | vary | 1 | 1 | vary | depend on data | |
| 8 | 2 | 2 | vary | 8 | vary | vary | vary | 2 | 2 | same | | |
| 9 | 2 | 3 | vary | 12 | vary | vary | vary | 1 | 1 | same | | |
| 10 | 2 | 3 | vary | 12 | vary | vary | vary | 1 | 2 | same | | |
| 11 | 2 | 3 | vary | 12 | vary | vary | vary | 1 | 3 | same | ... | |
| | 3 | 4 | vary | 24 | vary | vary | vary | 1 | 1 | up to 60 | vary | |
| | 3 | 4 | vary | 24 | vary | vary | vary | 2 | 1 | up to 120 | vary | |
| | 4 | 4 | vary | 32 | vary | vary | vary | vary | depend on data | | | |
| | 5 | 6 | vary | 60 | vary | vary | vary | vary | depend on data | | | | and so far practically endlessly because of the range includes diversity of modifications that are much more then the introduced RE range.

Here Nled and Vled are numbers of cylinders and summary displacement volumes of engine led to 4-stroke RE; Nled=2×N×P; Vled=Vc×Nled. Π is compression ratio; Vck (k=1; 2; 3 . . . N) is displacement volume of an equivalent cylinder under No k, if vary.

Set of numbers pistons P, cylinders N and displacement volume Vied identifies certain KE.

Next numbers of the above table are optional.

So, KE=P×N×Vc{×Nled×Vled×Π×R×M×D×AAl×Vck} is the entirely identifying KE set.

Choice of Vc as base displacement volume of alone equivalent cylinder of KE was taken by analogy with RE where this is a geometrical parameter which defines power of the cylinder. Vt cannot be base volume because in KE Vt may be taken voluntarily or for assign of certain ratio R.

For instance, according to above classification, KE=6×7× 500{×84×42.000×40×1.5×3×5×110×500} is K.Engine with 6 pistons, 7 equivalent cylinders (7 cylinders in compressor, 7 cylinders in turbine, 7 combustion chambers), 500 sm.cubic of displacement volume of alone equivalent cylinder {and optional data: equivalent of 84 cylinders RE; equivalent to 42 liters RE; compression ratio 40; expansion ratio 1.5; 3 combustors in every combustion chamber, 5 detachable arms, up to 110 degrees AAl and displacement volume of every equivalent cylinder 500 sm.cubic}.

For reference: such engine "in metal" will have outside diameter of housing 25 in. (0.6 m), size along axle 12 in (0.3 m), weight 300 pounds (140 kg). Every power stroke of the engine occurs in 9 degrees (a parameter showing an uniformity of a torque); equivalent diameter of crankshaft is about 20 in (0.5 m)(a parameter proportional to the torque).

Real prototype of the engine was popular in 50–60 s of 20 century Russian star-view aviation motor ASh-82 for planes and helicopters (IL-14, MI-24) with following main parameters: diameter 1.26 m, 18 cylinders, displacement volume 41.2 liters, compression ratio 8, weight 1020 kg, power 1900 HP on 2600 rpm. Next power stroke occurs in 20 degrees and diameter of crankshaft is about 6 in.

So, the torque of the KE is higher and more uniform. Balancing of KE as representative of rotary machines is simpler and better.

In compare with traditional ICE described KE has the following advantages:
less geometrical and weight parameters on same displacement volume;
torque is more in size and uniformity;
less fuel consumption; more harmless and noiseless exhaust;
simpler manufacturing and operation;
more reliable; better balance;
wider and smoother adjustment abilities;
wider application and modification ranges.

Simplicity and above enumerated advantages of KE compensate expenses of high technology in metal-ceramic combinations, heat-resistant materials and precision metal treatment.

What I claim as my invention is:
1. A rotary K. Engine having an improvement in a thermodynamic cycle comprising:
(a) a piston rotary turbine and a piston rotary compressor;
(b) a piston rotary turbine housing and a piston rotary compressor housing;
(c) said piston rotary turbine and piston rotary compressor having equal number of piston (P) and equal number of partitions (N), or said number of piston (P) being equal or less than said number of partitions (N);
(d) a phase shift between said pistons of said piston rotary turbine and said piston rotary compressor being up to 180 degrees;
wherein said piston rotary turbine and said piston rotary compressor are coaxially separated;
wherein a ratio R of displacement volume of said piston rotary turbine to a displacement volume of said piston rotary compressor is greater than one

$$R = \frac{Vt}{Vc} > 1;$$

(e) said piston rotary turbine housing and a piston rotary compressor housing further comprising:
annular channels;
a piston rotary turbine shaft and a piston rotary compressor shaft;
a piston rotary turbine rotor and a piston rotary compressor rotor;
pistons and partitions of said piston rotary turbine and said piston rotary compressor dividing said annular channels for separate cylinders;
wherein said partitions are mounted on pivoted levers and perform arc-view staggering so that arcs have opposite curvatures and opposite orientations of axles of said pivoted levers about a rotational axis of the shafts;
wherein said axles are disposed behind the partitions at a piston rotary turbine side;
wherein said axles are disposed ahead the partitions at a piston rotary compressor side; and
wherein said pistons and partitions have contacts at the end of a compression stroke and just before an expansion stroke; and adjacent surfaces of said partitions and said pistons coincide and said cylinders have zero volumes;
(f) control means adequate in said piston rotary turbine and said piston rotary compressor for coordinating motion of said partitions and pistons and for varying of said K. Engine displacement volume further comprising:
at least one control wheel of said piston rotary turbine and said piston rotary compressor with smoothly curved secluded control lines, grooves or rails for coordinating motion of said partitions and pistons and for varying of said K. Engine displacement volume; and
a plurality of detachable and undivided lead arms connecting to said control lines;
wherein each of said detachable and undivided lead arms comprises:
a lower arm permanently contacting with said control lines and staggering on a pivoted pendulum;
an upper arm being fixedly tied to one of the pivoted levers of said partitions; and
a balance lock for connecting and disconnecting said upper arm to said lower arm;
wherein said balance lock is mounted on motionless support; when a command is "to unlock, said balance lock means fixedly joins said upper arm with said support in an up-position simultaneously with a disconnection of said upper arm and said lower arm; and when a command is "to lock", said balance lock means simultaneously frees said upper arm from said support and connects both said upper arm and said lower arm;

(g) a plurality of separated combustion chambers of constant volume combined with rotary valve mechanism comprising oblong cases fixedly mounted on a periphery of said piston rotary turbine housing and a piston rotary compressor housing;

wherein each of said oblong cases included an admission opening for said piston rotary compressor; an omission opening for said piston rotary turbine; fitting caps; a fuel nozzle, a ventilation flange; and a sealing lid;

wherein each of said oblong cases has an inside revolving thermo-elastic body with at least one combustor;

wherein said at least one combustor has openings and holes functionally and positionally adequate to said openings and holes of said oblong cases, so that each of said adequate pair of said openings and holes, during a revolution of said revolving thermo-elastic body, periodically coincides with an effect of opening valves and in other period with an effect of closed valves for securing the working cycles of said combustion chambers comprising:

suction/admission and distribution of an air and gas; mixture of air-and-fuel, ignition, injection of fuel and compression of air, combustion during a reasonable period as an analog of advance of an ignition (AAI), and forced ventilation;

wherein said ventilation takes place as a volume of a portion of a preliminary compressed air is equal or greater than a volume of said at least one combustor through both said opening of said piston rotary compressor and a ventilation hole.

2. The rotary K. Engine with an improvement in a thermodynamic cycle according to claim 1, combined from an ideal Otto cycle in a combustion stage (left part) and ideal Brayton cycle in an expansion stage (right part);

wherein said ideal Otto cycle in a combustion stage is materialized in substantially constant volume of said separated combustion chambers;

wherein ideal Brayton cycle in an expansion stage is materialized in said piston rotary turbine having a ratio of displacement volume to a displacement volume of said piston rotary compressor is greater than one; and wherein said combustion is complete owing to high pressure, sufficient duration of burning as perfected analog of advance of an ignition (AAI) and an absence of rests of burnt away gas before fresh air charge.

3. The rotary K, Engine with an improvement in a thermodynamic cycle according to claim 1, wherein said displacement volumes of said piston rotary and said piston rotary compressor are adapted for an operational adjustment without a break effect by said balance lock means of said detachable arm through a connecting pin and a caliber protrusion:

when said detachable arm is locked, said connecting pin joins said upped arm and said lower arm;

when said detachable arm is unlocked, said caliber protrusion pushes out the connecting pin from said upper arm, disconnects said upper arm from said lower arm simultaneously with a fixed connecting said upper arm with said motionless support so that said upper arm stops with certain partition in an upper position lo let said piston freely pass through; and thus certain cylinder with the displacement volume is turned off from a work; and said pin does not join said upper arm and said lower arm, and said pin freely staggers with lower arm.

4. The rotary K, Engine with an improvement in a thermodynamic cycle according to claim 1, wherein said balance lock connects and disconnects mobile details of said detachable arm in a position of a dead center on a run without speed synchronizers.

5. The rotary K, Engine with an improvement in a thermodynamic cycle according to claim 1, wherein an adjustment of said displacement volume takes place in said piston rotary turbine and said piston rotary compressor simultaneously by adequate control means.

6. The rotary K, Engine with an improvement in a thermodynamic cycle according to claim 1, wherein said oblong cases and said inside revolving thermo-elastic body of the plurality of said separated combustion chambers are replaceable/changeable for repairing and setting up new parameters of said rotary K. Engine.

7. The rotary K, Engine with an improvement in a thermodynamic cycle according to claim 1, wherein said oblong cases are mounted on tangential planes to said annular channels of said piston rotary turbine and said piston rotary compressor and said inside revolving thermo-elastic body in a position of said closed valves in said admission and omission openings coincide to secure minimal stray air volumes.

8. The rotary K. Engine with an improvement in a thermodynamic cycle according to claim 1, wherein said at least one combustor has a phase shift between said omission opening of said piston rotary turbine and said admission opening of said piston rotary compressor equal or less then 180 degrees; and said at least one combustor is performed in form of spiral to secure said phase shift.

9. The rotary K. Engine with an improvement in a thermodynamic cycle according to claim 1, wherein said inside revolving thermo-elastic body is performed with longitudinal rectilinear and transversal circular grooves on an external surface to be filled with sealing and lubricating stripes, rings, or double semi-rings of ceramic, graphite, or other heat and abrasion resistant material;

wherein said rings or said double semi-rings have side cavities for penetrating said sealing and lubricating stripes to get better sealing; and wherein both ends of said inside revolving thermo-elastic body are corrugated diaphragms with sealing.

10. The rotary K. Engine with an improvement in a thermodynamic cycle according to claim 1, wherein said analog of advance of an ignition (AAI) reaches up to 540 degrees of the rotation of said shaft depending on number of combustors, the phase shift between the admission opening of said piston rotary compressor and the omission opening of said piston rotary turbine in said at least one combustor, a gear ratio, the number of the pistons of said piston rotary compressor and the phase shift said piston rotary turbine and said piston rotary compressor.

11. The rotary K. Engine with an improvement in a thermodynamic cycle according to claim 1, wherein said fuel nozzle of each separated combustion chambers is connected with a block of number of fuel injectors working successively to secure high-frequent fuelling.

* * * * *